United States Patent [19]

Shoop

[11] Patent Number: 5,251,431
[45] Date of Patent: Oct. 12, 1993

[54] BAR RAKE ATTACHED TURNTABLE DEVICE

[76] Inventor: Craig A. Shoop, 299 Shoop Rd., Halifax, Pa. 17032

[21] Appl. No.: 904,040

[22] Filed: Jun. 25, 1992

[51] Int. Cl.⁵ .................. A01D 43/02; A01D 78/14
[52] U.S. Cl. .................................... 56/366; 56/377; 56/DIG. 21; 239/685
[58] Field of Search ............... 56/14.8, 366, 367, 377, 56/380, 384, 396, DIG. 21; 239/685

[56] References Cited

U.S. PATENT DOCUMENTS

| 4,730,447 | 3/1988 | Fisher et al. | 56/DIG. 21 |
| 4,757,672 | 7/1988 | Roger | 56/377 X |
| 4,926,625 | 5/1990 | Laquerre | 56/366 X |

Primary Examiner—David J. Bagnell
Attorney, Agent, or Firm—John P. Halvonik

[57] ABSTRACT

The invention relates to a windrow inverting device pulled by a tractor to turn over hay rows and aid in the drying process of the windrows. The windrow inverting device comprises a rotating turntable in connection with a rake also pulled by a vehicle. The raking device picks up hay and sends it on to the turntable for inversion. The turntable is mounted for rotation and is in connection with a wheel of the vehicle to provide turning movement to the turntable. The turntable rotates clockwise to propel hay to the left of the vehicle or counter-clockwise to propel hay to the right of the vehicle thereby inverting the windrow in the process.

6 Claims, 6 Drawing Sheets

BAR RAKE ATTACHED TURNTABLE DEVICE

FIELD OF INVENTION

1. Background of the Invention

The invention relates to the field of windrowing machines, and in particular, to a windrowing machine that inverts windrows through the use of a ground-driven turntable and raking assembly that is pulled by a vehicle.

2. Description of the Prior Art

While there are rotating parts that are used on windrowing machines, none that applicant is aware of are adapted for catching hay from a rake and propelling the hay to one side of the tractor for the purpose of inverting the windrow.

SUMMARY OF THE INVENTION

The invention is a windrow inverting machine that comprise a raking means pulled by a tractor, or other vehicle, and a rotating turntable in connection with a wheel of the machine. The turntable is between the raking means and the vehicle. The turntable rotates in a direction that tosses hay picked up by the raking machine to one side of the raking means. The plane of the turntable is preferably at an angle toward the raking means. The wheel is frictionally engaged with the outside edge of the turntable (looking down on the turntable) so that the lower portion of the turntable will be rotating toward the outside of the vehicle and hay will be propelled to the outside.

It is an object of the invention to provide a windrow inverting machine that uses a rotating turntable that catches hay thrown by a raking machine and sends it to one side thereby inverting said windrow in the process.

Another object of the invention is to provide a windrow inverting machine that can easily be attached to existing raking machines.

Another objective is to provide a windrow inverting machine that will provide a more fluffed up windrow.

Still another objective is to provide a windrow inverting machine that will aid in removing stones from the windrow.

Yet another objective is to provide a windrow inverting machine that will invert windrows with a 90 percent or more total efficiency.

Other objectives of the machine will become apparent to those skilled in the art once the game has been shown and described.

DESCRIPTION OF THE PREFERRED EMBODIMENT

Figure 1:
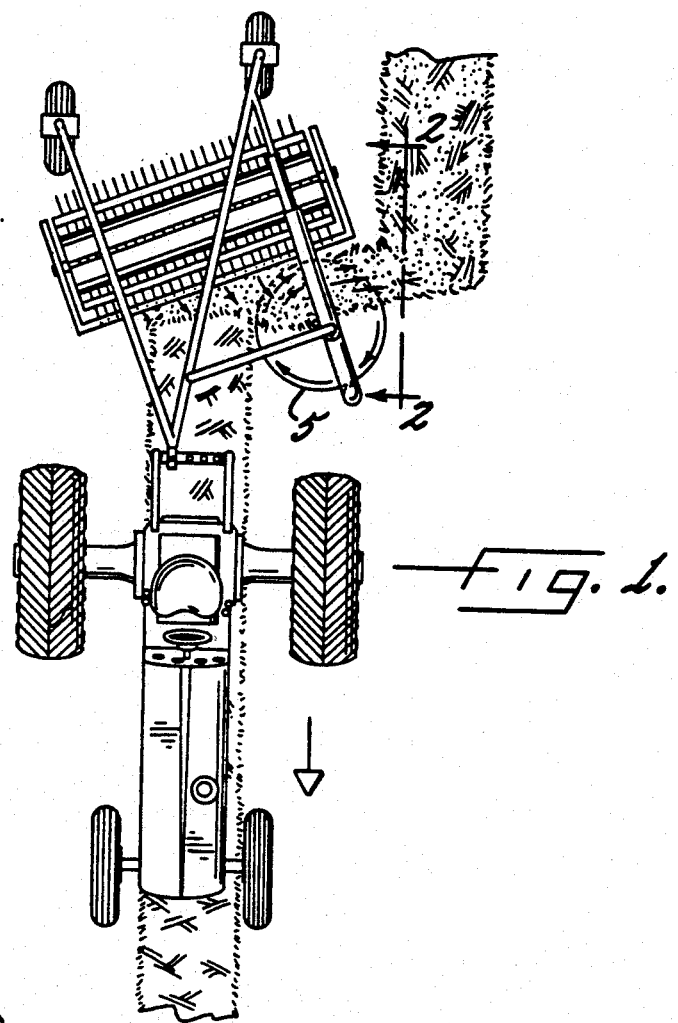
FIG. 1 Top view of the hay bar rake and turntable and tractor.
Figure 2:
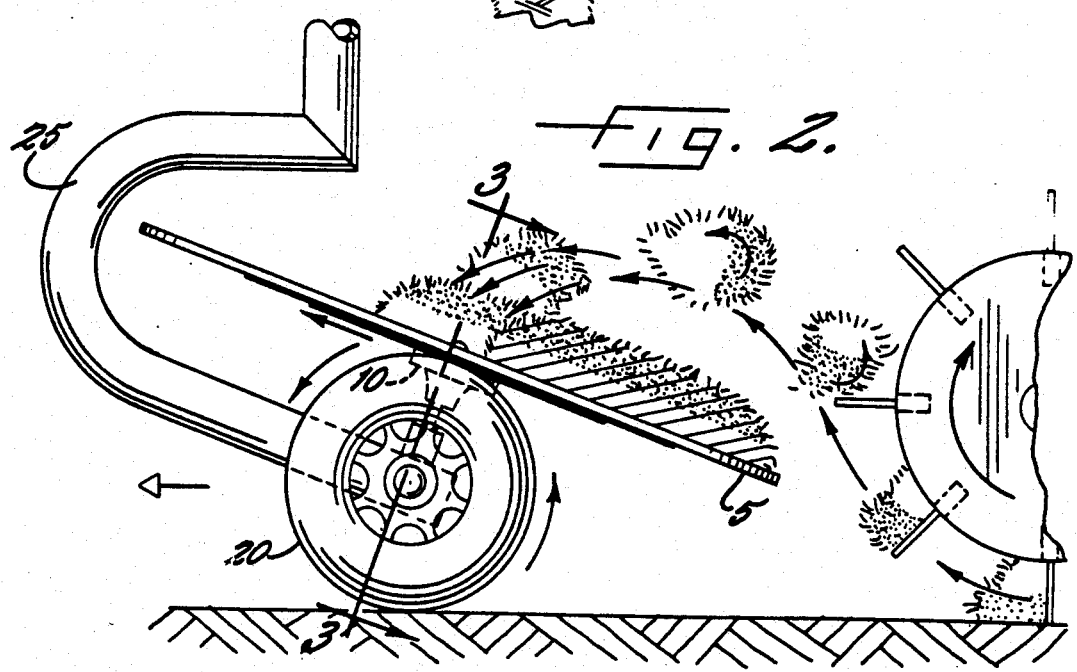
FIG. 2 Movement of hay from rake to turntable.
Figure 3:
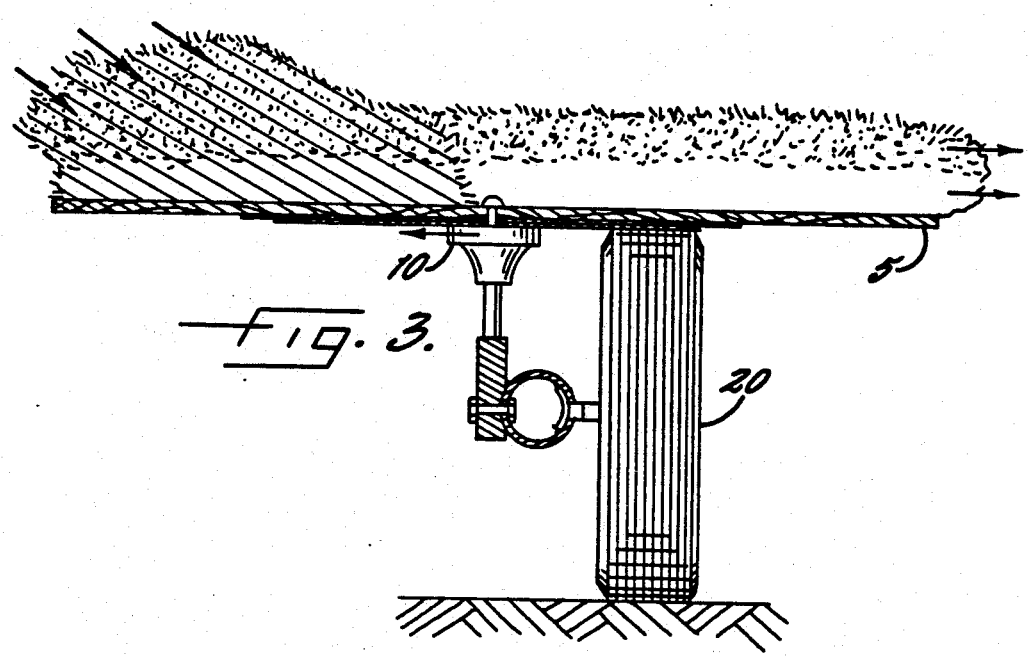
FIG. 3 Front view of ground wheel and turntable.
Figure 4:
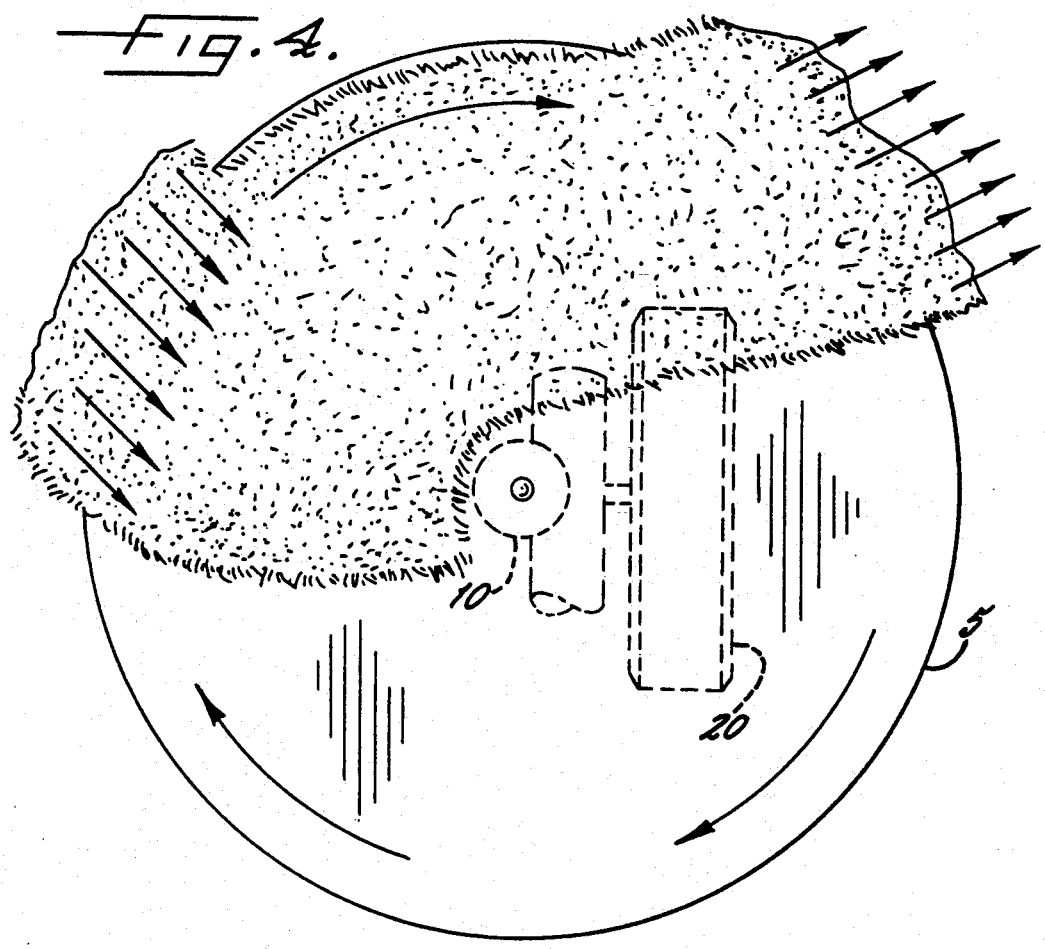
FIG. 4 Overhead of turntable showing path of hay.
Figure 9:
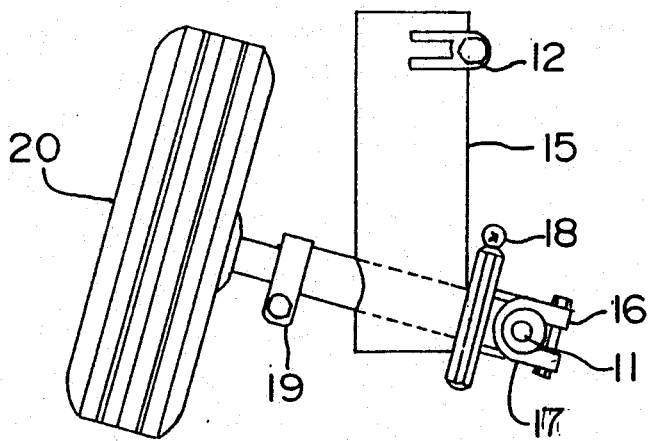
FIG. 9 Overhead view of ground wheel.
Figure 5:
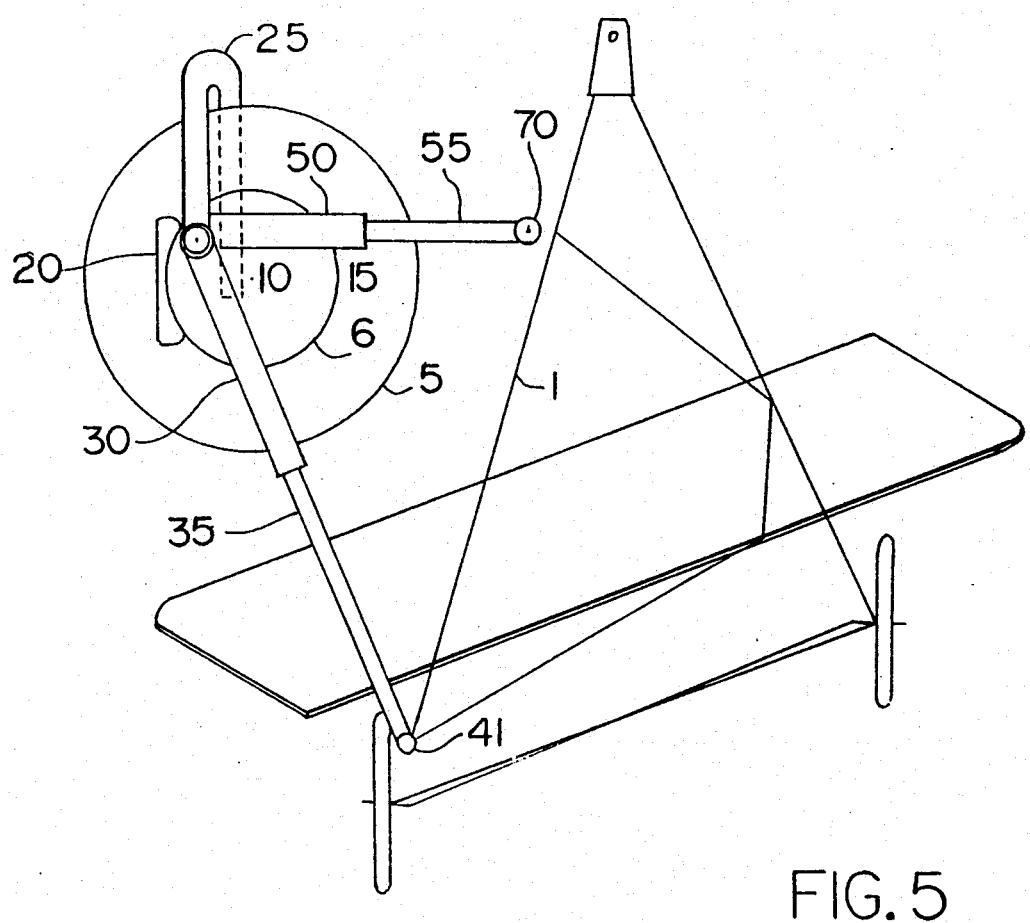
FIG. 5 Overhead view of framework and turntable.

The rotating turntable 5 and a standard wheeled raking device are connected to one another for movement behind a vehicle. This may be for example, a tractor. The turntable collects the hay from the windrow as it is turned up by raking machine and inverts the windrow as the hay is spun off the turntable to one side of the raking device, see FIG. 1.

The turntable is located between the raking device and the vehicle and is mounted to the V shaped framework 1 that is associated with most raking devices of this type. A front hitch pin 70 connects the front connecting arm 50 and front adjustment arm 55 of the turntable assembly to a forward portion of the framework and the hitch pin 41 connects the rear arms 30 and 35 of the assembly to a portion of the rear of the framework.

Figure 6:
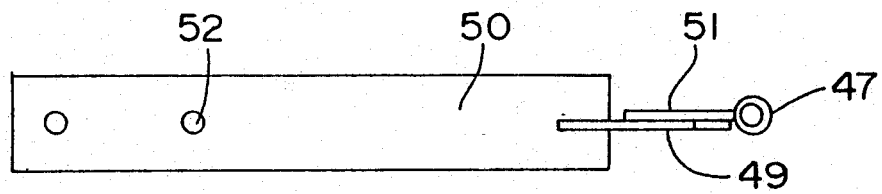
FIG. 6 Overhead view of front connecting arms.
Figure 7:
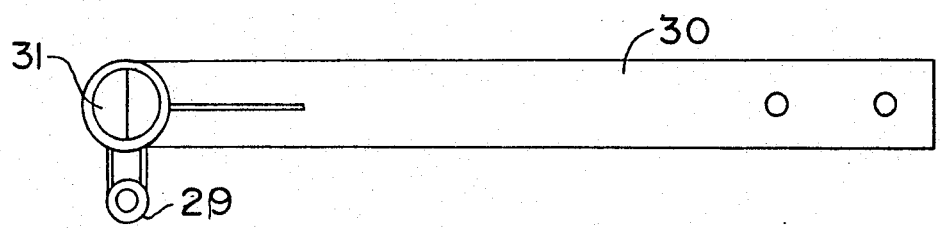
FIG. 7 Overhead view of rear connecting arm.
Figure 8:
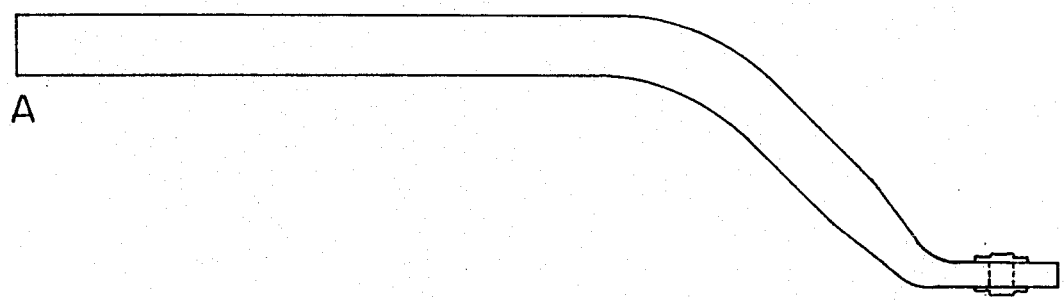
FIG. 8A Top view of read adjustment arm.
FIG. 8B Side view of rear adjustment arm.
Figure 8:
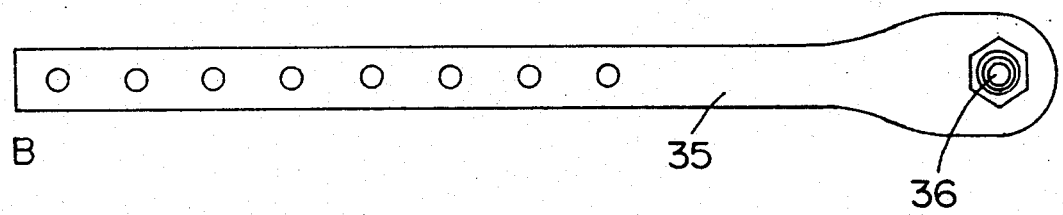
Figure 10:
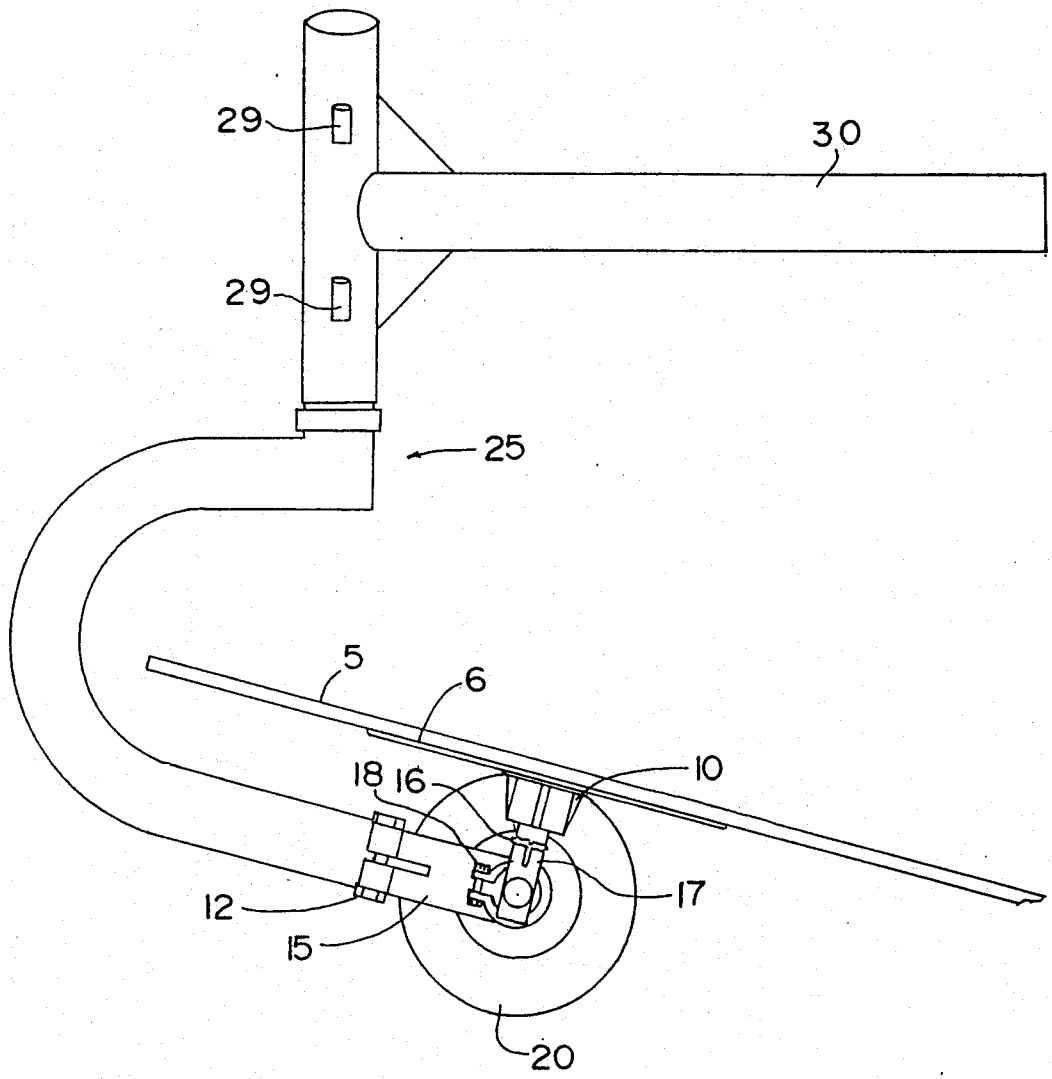
FIG. 10 Side view of ground wheel and turntable.
Figure 11:
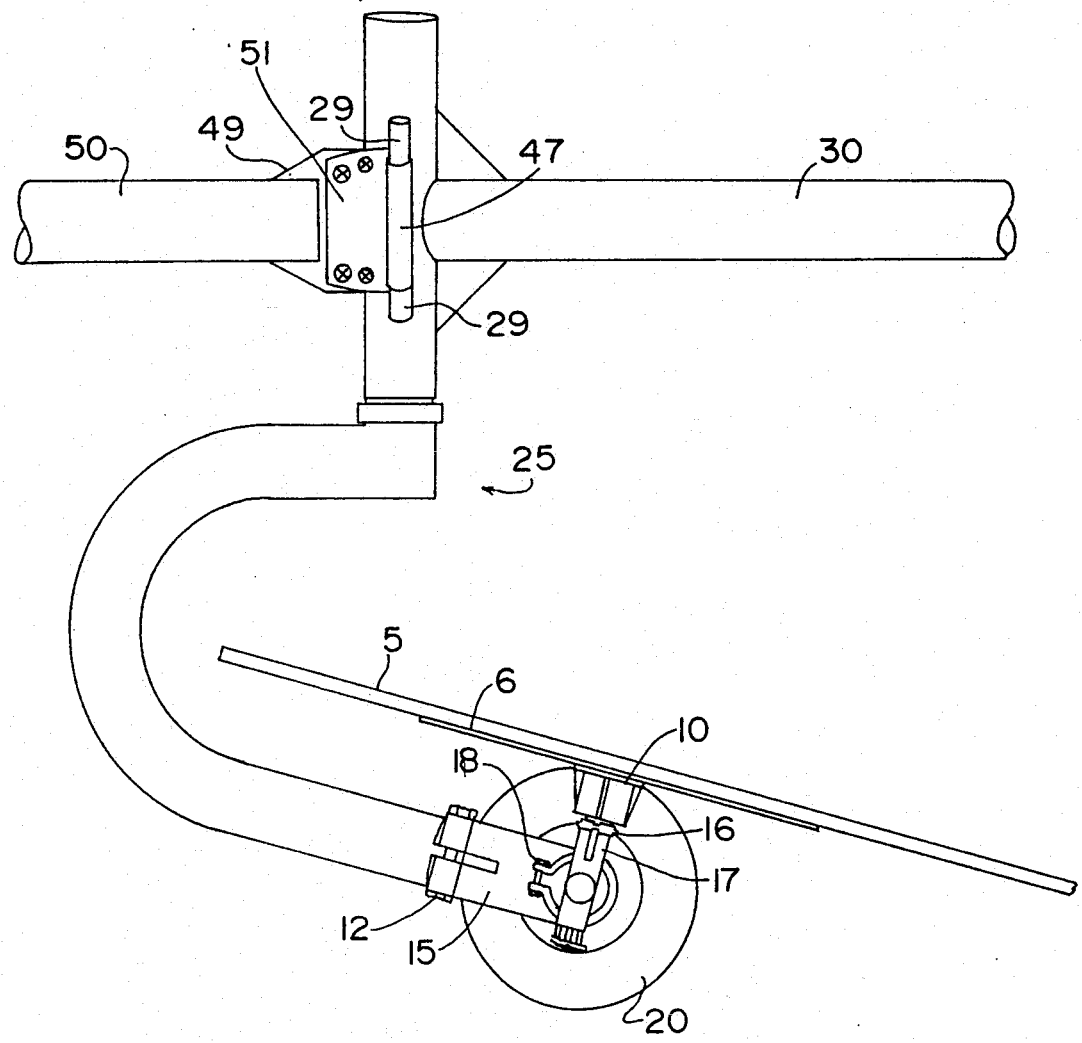
FIG. 11 Side view of ground wheel with front connecting arm in place.

Each of the connecting arms are built as a pair of tubes that slide within one another in order to provide adjustment of the distance between the turntable and rake frame for different models and sizes of rakes. The adjustment tubes 55 and 35 each have a series of holes to allow for variable placement of the ends of the tubes 50 and 30 by means of a pin that goes through a hole at the end of the connecting arm and one of the series of holes in the adjusting arm 35 and 55. See FIGS. 6-8(a,b). Preferably these holes would allow for 2" variability in length.

At one end of connecting arm 50 is an adjustment plate 51 bolted or otherwise connected to back plate 49. The back plate has a tube 47 running perpendicular to arm 50. Plate 51 has a series of holes preferably 4 in order to vary the orientation of the two plates 49 and 51 to adjust the downward angle of the arm as it meets the frame, again this is to account for different models and sizes of frames.

The front arm is connected alongside the rear arm by the tube 47 connected to a bushing 29 of the rear arm by means of a pin placed through each. Tube 30 is connected in a similar way with tube 31 placed over the spindle 26 of the caster 25. Tube 30 is built symmetrically so that it may be turned over in order to attach the turntable to the left side of the rake if that is so desired.

The spindle mount sleeve 15 is placed over one end of the caster frame member 25 and connected by the clamp 12. The use of the sleeve 15 allows it to be rotated 180° around the member in order to place the wheel on the opposite side of the caster member and thus it will be in contact with the opposite side of the turntable. This allows one to vary the direction of the movement of the turntable as the turntable is driven by the wheel.

The orientation of the turntable should be pitched slightly backward, about 10-30 degrees, in order to place the back edge of the turntable as close to the bottom of the rake as possible. This is to ensure the pickup of as much hay as possible. The turntable should have a relatively smooth surface, there should not be hub in the middle as this would interfere with the movement of hay across the turntable. It is preferred that the diameter of the turntable be about 48 inches. It is preferred that the rotating turntable be of steel for extended use. Other optional means may be used to drive the turntable including a hydraulic means or the use of a gear box.

The wheel 20 is mounted along an axle which is placed through an aperture in the sleeve 15. Clamps 19 and 18 secure the axle to the sleeve. The use of clamps allows one to vary the position of the wheel in order to make sure that it is snugly against the bottom of the turntable. The clamp 16 connects the spindle axis 11 to the spindle mount 17. The axis may be slid up or down to vary the height of the turntable and then set with the clamp 16. Clamp 18 may be loosened in order to vary the orientation of the spindle sleeve 17 in order to vary the pitch of the turntable. The use of all of the clamps, 12, 16, 18, and 19 may be used to vary the orientation of the turntable to make it as close to the rake as possible.

The ability to vary the position of the turntable allows one to change the height of the turntable and its angle so as to adapt the movement of the turntable for different conditions of hay such as wet or dry. A higher angle may be desirable when the hay is wet in order to lift the heavier hay upward and put more force on the propelling movement.

The frictional turntable should be placed between the rake and vehicle and to one side (left or right) of the centerline of the vehicle and rake. The offset placement is so that the turntable will not interfere with the initial action of the rake on the windrow. The turntable is mounted to the framework so that it is on one side of the centerline. If, for instance, the turntable is mounted left of the centerline it will be adapted to throw hay out toward the left and, thus, to one side of the machine.

The turntable should be in frictional contact with a ground wheel 20. The wheel should be mounted so that the top portion of the wheel is in contact with the outside edge of the turntable traction disk 6 (i.e.: that portion of the turntable traction disk that is furthest away from the center line). This will enable the rearward part of the turntable, closest to the rake, to be turning toward the outside. Hay that is flung forward from the rake will be caught near the lower portion of the turntable closest to the rake and flung to the side of the rake.

The turntable should be mounted on a central axis to allow it to rotate. The turntable should be mounted at angle of about 10–30 degrees to allow for it to carry away the hay to fullest advantage. The tilt should be one that has the lowermost portion of the turntable close to the rake so that that portion will gather the hay easily.

The turntable is mounted on a caster means 25 which allows it to align with the direction of travel. The caster is constructed in such a manner as to allow enough space for the turntable to rotate and for adjustments to be made in the angle of the plane of the turntable. The caster frame 25 supports the turntable while in contact with the ground drive wheel 20 and the caster frame helps protect both from obstacles.

The friction turntable would, preferably, be smooth in order to allow the hay to slide off easily.

The vehicle drives over each windrow and the rake picks up the hay and sends it forward. The windrow is caught by the rotating turntable 5. The table is turned by friction supplied by the ground driven wheel 20 which is connected to the traction plate 6. The traction plate 6 should may be made of steel or aluminum.

The surface of the turntable should be flat without protrusions to allow the hay to move across once it is picked up by the rake and flung onto the friction turntable. Steel or plywood would, preferably, be used for constructing the turntable. It is noted that the use of the turntable tends to throw rocks farther to the side of the vehicle than the hay and thus rocks tend to be separated from the windrow when this machine rakes them.

Because the windrow inverter is attached to one side of the raking means there is a turning restriction on movement to that side. If the turntable is mounted to the left of the rake then one should be careful when making left hand turns in order to avoid contact with the left tractor tire. If the tractor tire should contact the turn table, the caster action allows the turntable to be pushed away at first thus giving the driver time to limit his turning.

I claim:

1. A windrow turning device for pulling by a vehicle over windrows to thus invert such windrows comprising: raking means for contacting said windrow and pushing said hay forward and upward, said raking means mounted on wheels and attached to said vehicle for pulling in a forward direction, framework in connection with said raking means, turntable in connection with said framework and mounted to one side of a centerline bisecting said raking means, said turntable fixed for rotational movement along a plane tilted toward said raking means, ground wheel in connection with said framework and in frictional connection with one side of said turntable so as to impart rotational movement to said turntable.

2. The apparatus of claim 1 having a caster in connection with said turntable.

3. The apparatus of claim 1 wherein said turntable is made of steel.

4. The apparatus of claim 2 wherein said turntable is mounted at an angle of about 10–30 degrees from parallel to the ground.

5. The apparatus of claim 4 wherein said turntable is about 48" in diameter.

6. The apparatus of claim 5 wherein said turntable is mounted about 8–24" in front of said raking means.

* * * * *